United States Patent
Sasaya

Patent Number: 5,435,844
Date of Patent: Jul. 25, 1995

[54] CELLULOSE SPONGE USING NON-WOODY PULP AS RAW MATERIAL AND METHOD OF PRODUCING THE SAME

[75] Inventor: Koji Sasaya, Yokohama, Japan

[73] Assignee: Nihon Kotsu Sangyo Kabushiki Kaisha, Yokohama, Japan

[21] Appl. No.: 151,896

[22] Filed: Nov. 15, 1993

[51] Int. Cl.⁶ .............................. C09D 101/02
[52] U.S. Cl. ..................... 106/122; 106/163.1
[58] Field of Search ..................... 106/122, 123.1

[56] References Cited

U.S. PATENT DOCUMENTS 5,133,834  7/1992  Capps ..................... 162/84

FOREIGN PATENT DOCUMENTS 2333013  6/1977  France .
2358436  2/1978  France .
2203585  8/1973  Germany .
3-231942  10/1991  Japan .
3-344740  10/1991  Japan .

OTHER PUBLICATIONS

Ott et al., ed., *Cellulose and Cellulose Derivatives*, Interscience Pub. Inc., N.Y., (1955) pp. 14–25, 962, 963.

Primary Examiner—David Brunsman
Attorney, Agent, or Firm—Fisher & Associates

[57] ABSTRACT

Cellulose sponge using non-woody pulp as raw material and a method of producing the same. According to the present invention, cellulose sponge can be produced without using wood pulp, with using vegetable cellulose of low plants, shrub, or the like to contribute to the prevention of the forest destruction and provide the way to use the waste material.

9 Claims, No Drawings

CELLULOSE SPONGE USING NON-WOODY PULP AS RAW MATERIAL AND METHOD OF PRODUCING THE SAME

BACKGROUND OF THE INVENTION

1. Field of the Invention

The present invention relates to cellulose sponge using vegetable cellulose as raw material obtained from non-woody material like stem, leaves and seed skin of low plants, shrub, or the like, and to a method of producing the cellulose sponge.

2. Background Art

Instead of synthetic resin sponge made of foamed urethane and the like which has been conventionally used, recently sponge using vegetable cellulose as raw material has been developed and receiving attention with respect to the higher antifungal properties of the raw material and the easier disposal as waste after being use (that is, the disposal is easy such that the sponge dose not generate gas which otherwise would affect adversely environment when being incinerated). Compared with the synthetic resin sponge which has been produced with using flon (chloro fluoro carbons) gases which have bad influences on the ozone layer and accordingly been regulated, the cellulose sponge has also been receiving attention in that it can be produced with using known expanding agents without using flon gases.

Such cellulose sponge is produced by taking out vegetable cellulose from wood as raw material, and the method of producing the sponge is such that at first, the wood of the raw material is made into chip, and then the chip is dissolved to obtain pulp (cellulose). Then, the dissolved pulp is treated with a sodium hydroxide solution, and thereafter, treated by being subject to the addition of a chemical such as carbon bisulfide and sodium hydroxide to obtain viscose, which becomes liquid having somewhat viscosity. Then, the obtained viscose is mixed with an expanding agent comprising sodium sulfide and the like to expand and coagulate the mixture. Thereafter the mixture is expanded and coagulated. The expanded product obtained by such coagulation is cleaned by a softening agent, a bleaching agent, a weak acid solution and the like, whereby the above-mentioned cellulose sponge is obtained. As a post-treatment, the sponge is subject to dehydration and drying, and then the raw cloth thereof, when subject to cutting processing, is made moist and cut into lengths each of which is then packed.

Now, since recently the forest destruction has been regarded as serious, the necessity of selecting proper material instead of wood as raw material of cellulose sponge has been discussed, and thus the possibility of increasing cost has become a concerned matter.

Therefore, in the view of the above-mentioned circumstances, an object of the present invention is to obtain cellulose sponge without using wood as raw material, and an object thereof is to contribute to the prevention of the forest destruction.

SUMMARY OF THE INVENTION

The present invention has been made considering the above-mentioned problems to provide cellulose sponge using non-woody pulp as raw material, preferably vegetable cellulose of low plants, shrub or the like as raw material, thereby solving the above-mentioned problems.

Further, another invention is a method of producing cellulose sponge characterized in that the method comprises dissolving at least one kind of stem, leaves and seed skin of low plants, shrub, or the like as raw material to take out vegetable cellulose therefrom, mixing said vegetable cellulose with an expanding agent to expand the mixture, expanding the mixture, coagulating the mixture to produce sponge, so that the invention provides the production method to solve the above-mentioned problems.

DETAILED DESCRIPTION OF THE PREFERRED EMBODIMENTS

Then, the present invention will be explained in detail on the basis of embodiments shown below.

Cellulose sponge according to the present invention is so-called "expanded material" using vegetable cellulose made of stem, leaves and seed skin of low plants, shrub, or the like as raw material, that is, the material using non-woody pulp as raw material.

In producing the cellulose sponge according to the present invention, the raw material thereof can use at least one kind of stem, leaves and seed skin of low plants, shrub, or the like, for example, rice hulls which have been disposed as useless material except a conventionally limited few applications. Other examples of the raw material employable in the present invention are flax plant, manila hemp, ramie, jute, reed, rush, bulrush, papyrus, kenaf, miscanthus, thatch, paper mulberry, mitsumata, and the like. In the present invention, almost all of stem, leaves and seed skin of low plants, shrub, or the like which is non-woody can be employed.

Then, in a manner similar to conventional pulp dissolving process, the material is dissolved to obtain dissolved product having vegetable cellulose, and treated with a chemical similar to conventional one to obtain viscose. Thereafter, the viscose is subject to processes similar to conventional ones, that is, expanding process and coagulating process. If necessary, cleaning process, squeezing process and drying process may be employable.

For example, rice hulls having been selected as the above-mentioned material contain a lot of fatty acid, so that the cellulose sponge obtained from the rice hulls can be used to clean tableware and the like without using detergent separately. Also, the selection and combination of non-woody material as raw material allows cellulose sponge having a required color to be obtained without using a coloring agent.

As explained above, the present invention is cellulose sponge using non-woody pulp as raw material, characterized in that said sponge uses vegetable cellulose of low plants, shrub, or the like as raw material, and a method of producing cellulose sponge using non-woody pulp as raw material, characterized in that said method comprises dissolving at least one kind of the stem, leaves and seed skin of low plants, shrub, or the like as material to take out vegetable cellulose therefrom, mixing said vegetable cellulose with an expanding agent to expand the mixture, and coagulating the mixture to produce sponge. The present invention allows cellulose sponge to be obtained without using wood as raw material, thereby contributing to the prevention of the forest destruction and providing the way to use the waste material. The present invention also causes the wood crushing, chip dissolving and pulp producing process to become unnecessary, so that the present invention exhibits an excellent effect on practicability, such as reduced production cost.

What is claimed is:

1. A cellulose sponge comprising a body, said body formed from a non-woody pulp.

2. The cellulose sponge claimed in claim 1, wherein said raw material is vegetable cellulose obtained from low plants or shrubs.

3. The cellulose sponge claimed in claim 2, wherein said raw material is vegetable cellulose obtained from stems, leaves or seed skin of low plants or shrubs.

4. The cellulose sponge claimed in claim 3, wherein said raw material is vegetable cellulose obtained from rice hulls, flax plant, manila hemp, ramie, jute, reed, rush, bulrush, papyrus, kenaf, miscanthus, thatch, paper mulberry or mitsumata.

5. The cellulose sponge claimed in claim 4, wherein said raw material is vegetable cellulose of rice hulls.

6. The cellulose sponge claimed in claim 4, wherein said raw material is vegetable cellulose of reed.

7. A method of producing cellulose sponge using non-woody pulp as raw material, characterized in that said method comprises the steps of: dissolving at least one kind of stem, leaves or seed skin of low plants or shrubs as a raw material to extract vegetable cellulose therefrom; mixing said vegetable cellulose with an expanding agent to expand a mixture therefrom; expanding said mixture and coagulating said mixture.

8. The method of producing cellulose sponge according to claim 7, further comprising a step of cleaning said expanded mixture after said coagulating step.

9. The method of producing cellulose sponge according to claim 7, wherein said raw material is vegetable cellulose obtained from rice hulls, flax plant, manila hemp, ramie, jute, reed, rush, bulrush, papyrus, kenaf, miscanthus, thatch, paper mulberry or mitsumata.

* * * * *